United States Patent [19]

Agiman

[11] Patent Number: 5,757,173
[45] Date of Patent: May 26, 1998

[54] SEMI-SOFT SWITCHING AND PRECEDENT SWITCHING IN SYNCHRONOUS POWER SUPPLY CONTROLLERS

[75] Inventor: Dan Agiman, Irvine, Calif.

[73] Assignee: Linfinity Microelectronics, Inc., Garden Grove, Calif.

[21] Appl. No.: 742,094

[22] Filed: Oct. 31, 1996

[51] Int. Cl.[6] .................................................. G05F 1/56
[52] U.S. Cl. ............................................................ 323/282
[58] Field of Search ..................................... 323/282, 284, 323/351; 363/22, 23, 24, 25, 17, 98, 132

[56] References Cited

U.S. PATENT DOCUMENTS

| 4,158,224 | 6/1979 | Kreyer et al. | 363/56 |
|---|---|---|---|
| 4,754,385 | 6/1988 | McDade et al. | 363/16 |
| 4,922,404 | 5/1990 | Ludwig | 363/89 |
| 5,535,112 | 7/1996 | Vazquez Lopez et al. | 363/20 |
| 5,552,695 | 9/1996 | Schwartz | 323/271 |
| 5,565,761 | 10/1996 | Hwang | 323/282 |

*Primary Examiner*—Matthew V. Nguyen
*Attorney, Agent, or Firm*—Loeb & Loeb LLP

[57] ABSTRACT

A control circuit for synchronous switching power supplies employing semi-soft switching during turn off and precedent switching during turn on. During turn off, an output voltage is compared to a reference voltage to turn on a synchronous switch after a primary switch is turned off. During turn on, a timing voltage ramp triggers the turn off of the synchronous switch prior to the turn on of the primary switch.

14 Claims, 7 Drawing Sheets

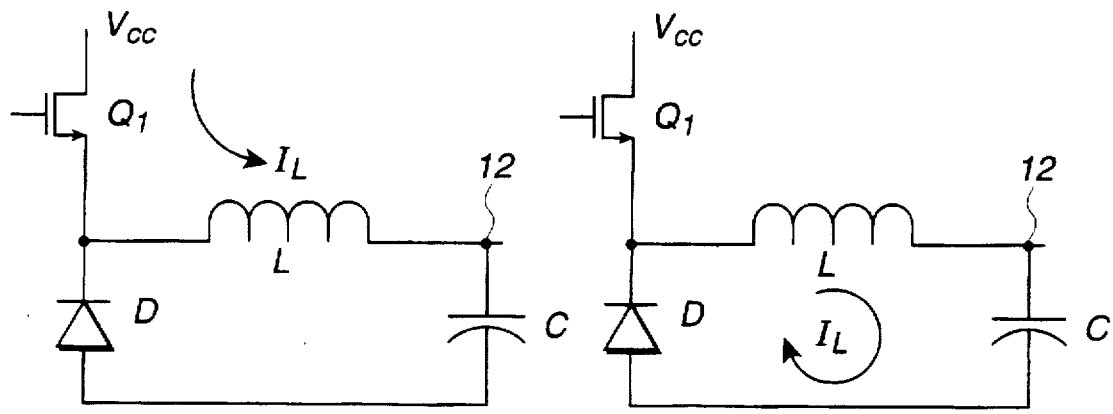
Fig. 1a
(Prior Art)
Fig. 1b
(Prior Art)
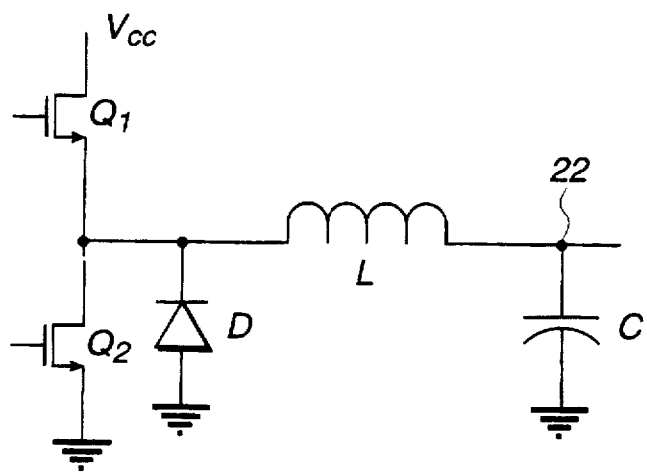
Fig. 2
(Prior Art)

SEMI-SOFT SWITCHING AND PRECEDENT SWITCHING IN SYNCHRONOUS POWER SUPPLY CONTROLLERS

BACKGROUND OF THE INVENTION

1. Field of the Invention

The present invention relates to power supply controllers employing synchronous switching, and in particular to semi-soft switching and precedent switching in such power supply controllers.

2. Description of the Prior Art

DC power supplies using synchronous switching are becoming common in low voltage power supply design, primarily due to the increased efficiency obtained with such methods.

FIGS. 1a and 1b show a simplified circuit diagram of a Buck converter. A MOSFET Q1 is used as an analog switch. The current flows from a supply voltage $V_{CC}$ to an output node 12 when the switch Q1 is turned on (FIG. 1a). When switch Q1 is turned off (FIG. 1b), the inductor current $I_L$ continues to flow through a diode D into an output capacitor C. While switch Q1 is turned off, power is dissipated in the diode D due to the voltage drop across the diode D. With a high current and a low output voltage, the power dissipation can adversely impact the overall supply efficiency significantly. For example, for a 10A, 3.0V supply, the power loss due to the diode could be about 16% of the total power.

To increase power supply efficiency, a control circuit shown in FIG. 2 has been used. This circuit is similar to the circuit shown in FIG. 1, with the exception of a second analog switch (MOSFET) Q2 coupled in parallel with the diode D. Switches Q1 and Q2 are typically referred to as the primary and the synchronous switch, respectively. During the off cycle when the primary switch is turned off, the synchronous switch Q2 turns on and provides a path for the inductor current to flow with a much lower resistance than the diode, thereby increasing efficiency.

In the circuit shown in FIG. 2, the synchronous switch Q2 must be switched out of phase with the primary switch Q1 so that the two switches are not turned on simultaneously. Even momentary simultaneous conduction of the two switches will result in large currents to flow through the two switches, decreasing the to efficiency of the power supply. "Brake before make" delay functions have been used to ensure that one switch is turned off before another switch is turned on. An example is the LT1158 from Linear Technology, schematically shown in FIG. 3.

In the LT1158, the turn on of each of the switches Q1 and Q2 is controlled by monitoring the gate to source voltages of the other switch to avoid having both switches on at the same time. The gate to source voltage of the primary switch Q1 is compared by a first comparator 31 to a first threshold voltage $V_{gs1(TH)}$, and the output of the comparison is ANDed by a first AND gate 32 with a clock signal 35 to drive the synchronous switch Q2. Similarly, the gate to source voltage of the synchronous switch Q2 is compared by a second comparator 33 to a second threshold voltage $V_{gs2(TH)}$, and the output of the comparison is ANDed by a second AND gate 34 with the inverse of the clock signal 35 to drive the primary switch Q1.

In operation, when the clock signal goes high, the primary switch Q1 turns off, causing the gate to source voltage of the primary switch Q1 to drop below the threshold level $V_{gs1(TH)}$ and turning on the synchronous switch Q2. When the clock signal goes low, the synchronous switch Q2 turns off, causing the gate to source voltage of the synchronous switch Q2 to drop below the threshold level $V_{gs2(TH)}$ and turning on the primary switch Q1. The levels of the threshold voltages $V_{gs1(TH)}$ and $V_{gs2(TH)}$ are chosen so that when the gate to source voltage of switch Q1 or switch Q2 is below the respective threshold level, it is assumed that the switch is turned off. This ensures that the synchronous switch Q2 will only turn on when the clock signal is high and when the primary switch Q1 is off, and vice versa. Therefore, switches Q1 and Q2 will not conduct simultaneously.

This type of brake before make scheme suffers certain disadvantages. For example, the turn on of the primary switch is delayed by the turn off process of the synchronous switch Q2. As a result, the off time of the primary switch is not constant. This delay effect is more significant in high frequency synchronous power supplies.

SUMMARY OF THE DISCLOSURE

It is an object of a preferred embodiment of the present invention to provide semi-soft switching for controlling the turn on of the synchronous switch after the turn off of the primary switch in a power supply controller utilizing synchronous switching. It is another object of a preferred embodiment of the present invention to provide precedent switching for controlling the turn off of the synchronous switch before the turn on of the primary switch in a power supply controller utilizing synchronous switching. It is yet another object of the present invention to provide a constant off time switching controller.

An aspect of a preferred embodiment of the present invention is semi-soft switching during the turn off of the primary switch. Another aspect of a preferred embodiment of the present invention is precedent switching during the turn on of the primary switch. The semi-soft switching and precedent switching schemes have the advantage of preventing shoot through currents in a power supply controller utilizing synchronous switching, and the further advantage of a constant off time.

In a power supply control circuit incorporating a preferred embodiment of the present invention, a primary and a synchronous switch are coupled in series between a supply voltage and the ground. The control circuit controls the turn on and turn off of the primary and synchronous switches so that the synchronous switch is turned on in a controller manner briefly after the primary switch is turned off (semi-soft switching), and is turned off in a controlled manner briefly before the primary switch is turned on (precedent switching).

Soft-switching for turning on the synchronous switch after turn off of the primary switch is accomplished by sensing the voltage at a switching node between the primary switch and the synchronous switch. When this voltage is lower than a predetermined reference voltage, the primary switch is considered off and the synchronous switch is turned on. To prevent the turn on of the synchronous switch in response to a false output signal such as an output short, logic is provided such that the sensed voltage at the switching node is used to turn on the synchronous switch only when the control signal driving the primary switch indicates an off condition of the primary switch. This prevents simultaneous conduction of the two switches and thereby prevents shoot through current.

Precedent switching for turning off the synchronous switch before turning on the primary switch is accomplished by using a timing circuit to generate distinct timing events to turn off the synchronous switch before turning on the primary switch. The timing events are provided by a timing voltage ramp and two threshold voltages. When the timing voltage drops below the second threshold voltage, the synchronous switch is turned off. When the timing voltage subsequently drops below the first threshold voltage, the primary switch is turned on. Since the turn off of the synchronous switch and the turn on of the primary switch are triggered by separate timing events, the turn on of the primary switch is not delayed by the turn off process of the synchronous switch. As a result, the off time of the primary switch is constant. Precedent switching is especially advantageous in the applications of high frequency synchronous switching.

BRIEF DESCRIPTION OF THE DRAWINGS

FIGS. 1a and 1b show a simplified circuit diagram of a prior art Buck converter.

FIG. 2 is a simplified circuit diagram of a prior art power supply having a synchronous switch.

FIG. 5b shows timing diagrams corresponding to the circuit shown in FIG. 5a.

FIG. 6b shows timing diagrams for the circuit shown in FIG. 6a.

DETAILED DESCRIPTION OF PREFERRED EMBODIMENTS

According to a preferred embodiment of the present invention, the operation of a power supply controller utilizing synchronous switching has two aspects. During the turn off operation of the primary switch, a novel semi-soft switching scheme is employed to turn on a synchronous switch after the turn off of a primary switch. During the turn on operation of the primary switch, a novel precedent switching scheme is employed to turn off the synchronous switch before the turn on of the primary switch, providing constant off time.

Figure 3:
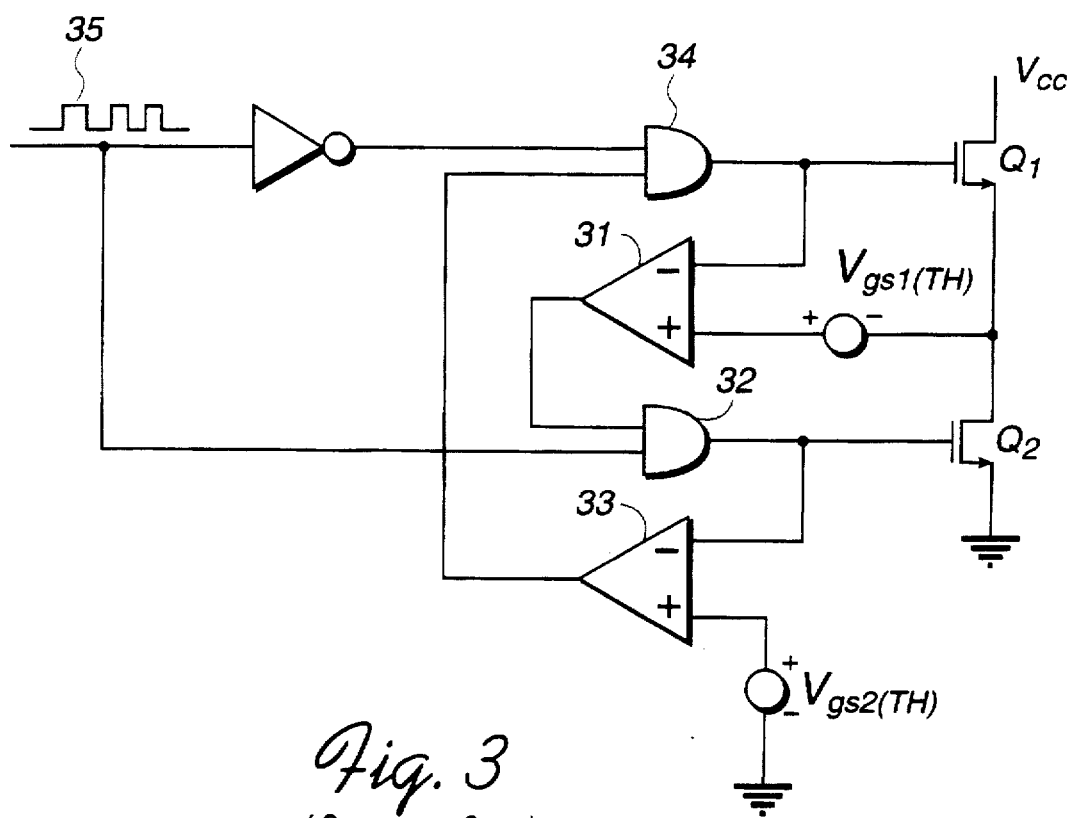
FIG. 3 is a simplified circuit diagram of a prior art control circuit for synchronous switching.
Figure 4:
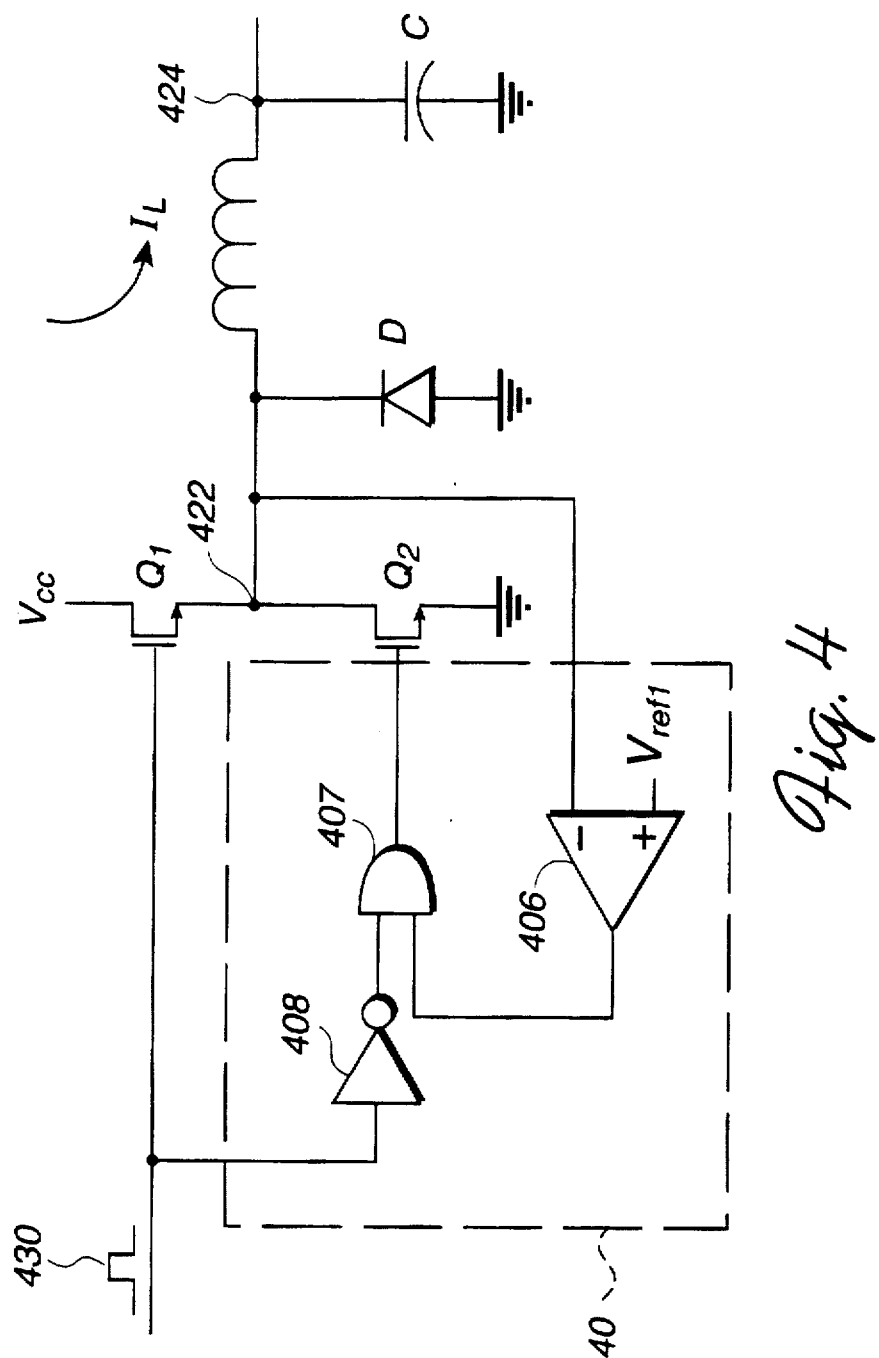
FIG. 4 is a simplified circuit diagram of a control circuit for semi-soft switching incorporating a preferred embodiment of the present invention.

FIG. 4 is a schematic diagram of a circuit incorporating a preferred embodiment of the present invention using semi-soft switching in a synchronous power supply. Devices Q1 and Q2 are switches each having a current path and a control terminal for controlling the conductivity of the current path. Each switch is in a conductive state ("enabled" or "on") allowing current to flow through its current path when an enabling control signal is coupled at its control terminal, and in a nonconductive state ("disabled" or "off") allowing substantially no current to flow through its current path when a disabling control signal is coupled at its control terminal. Devices Q1 and Q2 may be, for example, metal oxide semiconductor field effect transistors (MOSFETs) used as analog switches.

The first switch Q1 (the primary switch) and the second switch Q2 (the synchronous switch) are coupled in series between a supply voltage $V_{CC}$ and the ground defining a switching node 422. The primary switch Q1 is driven by an input signal 430. The voltage at the switching node 422 is sensed and compared to a reference voltage $V_{ref1}$ by a comparator 406. The reference voltage $V_{ref1}$ may be supplied by a temperature compensated voltage generator (not shown). The output of the comparator 406 is ANDed by an AND gate 407 with the inverse of the input signal 430 to drive the synchronous switch Q2.

The reference voltage $V_{ref1}$, the comparator 406, the AND gate 407 and the invertor 408 form a control circuit 40 for turning on the synchronous switch Q2 after the turn off of the primary switch Q1. In operation, when the input signal turns the primary switch Q1 off, the voltage level at the switching node 422 begins to drop. When the sensed voltage at the switching node 422 drops below the reference voltage $V_{ref1}$, the primary switch Q1 is considered off and the comparator 406 outputs a high voltage to turn on the synchronous switch Q2. The reference voltage $V_{ref1}$ may be set at any predetermined level between the supply voltage $V_{CC}$ and the ground to improve the efficiency of the circuit and to ensure that the synchronous switch Q2 does not turn on before the primary switch Q1 turns off.

By ANDing the output of the comparator 406 with the inverse of the voltage applied at the control terminal of the primary switch Q1, the synchronous switch Q2 is prevented from turning 'on' during a false condition such as an output short. This prevents the two switches Q1 and Q2 from turning on simultaneously, and thereby prevents shoot through currents. Therefore, this turn off operation has the benefit of soft switching, and also eliminates shoot through currents during the on to off cycle.

Figure 5A:
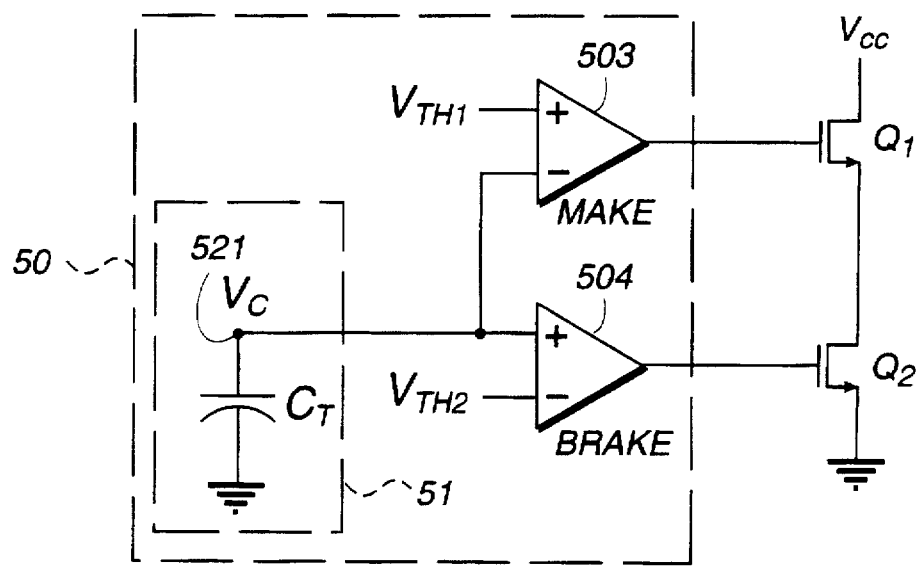
FIG. 5a is a simplified circuit diagram of a control circuit for precedent switching incorporating a preferred embodiment of the present invention.

Referring now to FIG. 5a, a schematic diagram of a circuit incorporating a preferred embodiment of the present invention using precedent switching in a synchronous power supply is shown. A first switch Q1 (the primary switch) and a second switch Q2 (the synchronous switch) are coupled in series between a supply voltage $V_{CC}$ and the ground. The voltage level $V_C$ (the timing voltage) at a timing node 521 is compared to a first and a second threshold voltage $V_{TH1}$ and $V_{TH2}$, respectively, by a first (MAKE) and a second (BRAKE) comparator 503 and 504, respectively. Each threshold voltage may be supplied by a temperature compensated voltage generator (not shown) and set at a predetermined level. The outputs of the first and second comparators 503 and 504, respectively, are used to drive the primary and the synchronous switch Q1 and Q2, respectively. The comparators 503 and 504, the threshold voltages $V_{TH1}$ and $V_{TH2}$, and the timing circuit 51 may form a thresholding circuit 50.

Figure 5B:
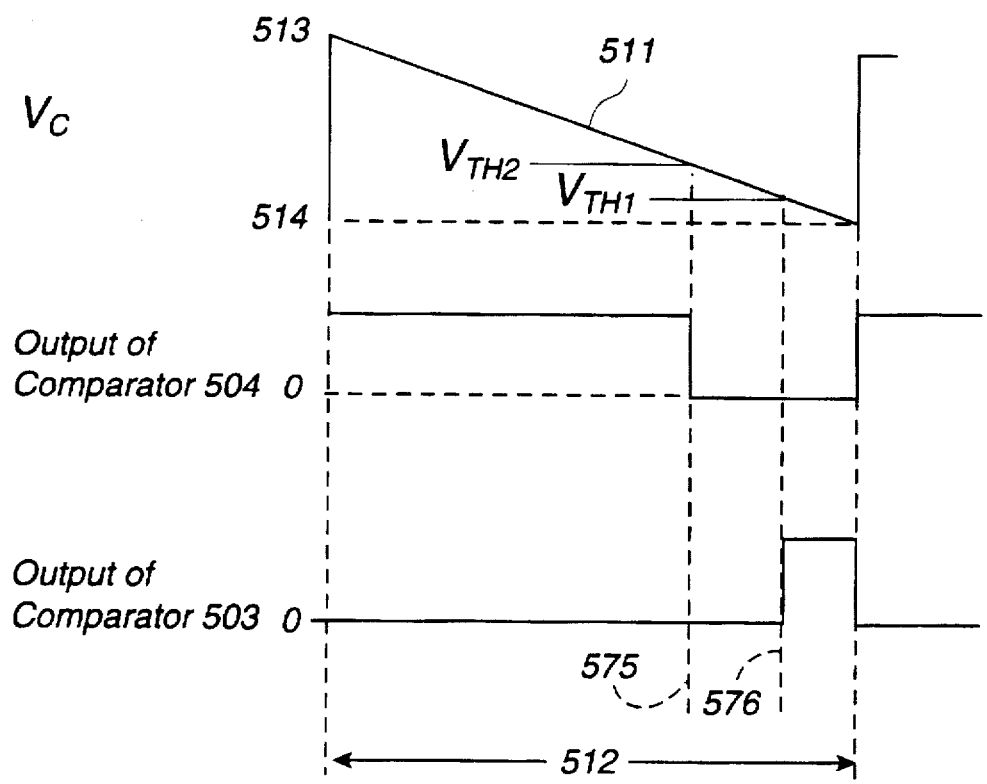

The timing voltage $V_C$ is supplied by a timing circuit 51 comprising a timing capacitor $C_T$. The timing capacitor $C_T$ may be charged by a charging voltage (not shown) during the on period of the primary switch, and discharged through a current generator (not shown) to generate a descending linear voltage level during the off period of the primary switch. FIG. 5b shows the voltage ramp waveform 511 going from a high voltage limit 513 to a and low voltage limit 514 during the off period 512. The predetermined threshold voltages $V_{TH1}$ and $V_{TH2}$ may be set at any levels between the voltage limits 513 and 514, so long as $V_{Th2}$ is higher than $V_{TH1}$. Preferably, both threshold voltages $V_{TH1}$ and $V_{TH2}$ are close to (e.g. within one half volt) the low voltage limit 514 of the voltage ramp 511.

In operation, during the off period, the timing voltage $V_C$ is initially higher than both threshold voltages $V_{TH1}$ and $V_{TH2}$, which keeps the primary switch Q1 off and the synchronous switch Q2 on. As the timing voltage $V_C$ drops below the second threshold voltage $V_{TH2}$ at a time point 515, the output of the second comparator 504 goes low and turns off the synchronous switch Q2. As the timing voltage $V_C$ subsequently drops below the first threshold value $V_{TH1}$ at a time point 516, the output of the first comparator 503 goes high and turns on the primary switch Q1.

By setting the second threshold voltage $V_{TH2}$ at a higher level than the first threshold voltage $V_{TH1}$, this circuit ensures that the synchronous switch Q2 is turned off before the primary switch Q1 is turned on. A further advantage of the brake before make scheme employed in the circuit shown in FIG. 5a is that the turn on of the primary switch Q1 is determined by a timing event 516 independent of the turn off process of the synchronous switch Q2. This is therefore a precedent switching scheme, in which the precedence is proportional to the off time of the controller. Since its turn on is not delayed by the turn off process of the synchronous switch Q2, the primary switch Q1 has a constant off time. Precedent switching is especially advantageous in high frequency synchronous power supplies.

Figure 6A:
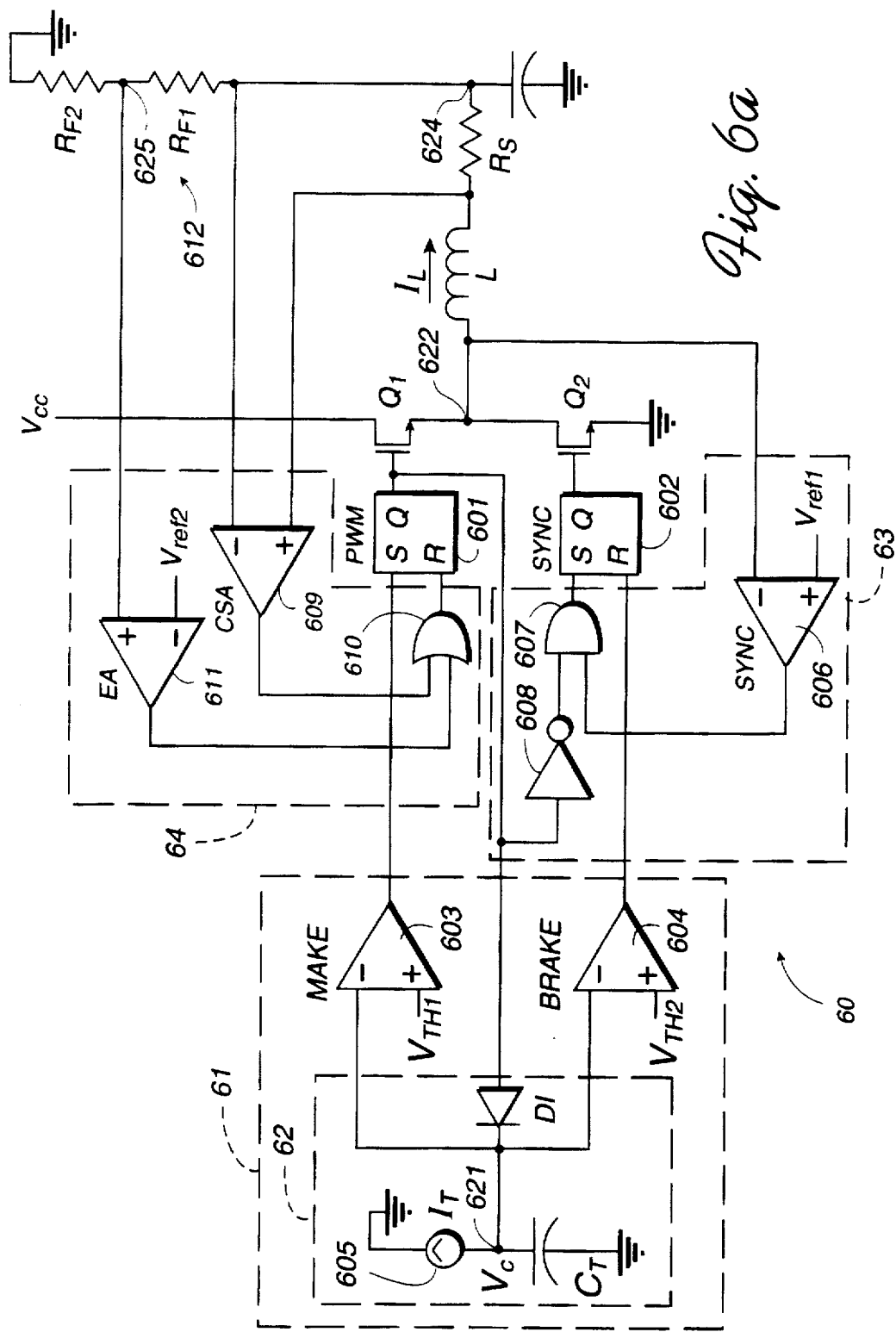
FIG. 6a is a simplified circuit diagram of a control circuit for semi-soft switching and precedent switching incorporating a preferred embodiment of the present invention.

FIG. 6a is a schematic diagram of a synchronous power supply control circuit 60 incorporating a preferred embodiment of the present invention using semi-soft switching for controlling the turn on operation, and precedent switching for controlling the turn off operation of a synchronous power supply controller. A first switch Q1 (the primary switch) and a second switch Q2 (the synchronous switch) are coupled in series between a supply voltage $V_{CC}$ and the ground defining a switching node 622. A timing circuit 62 defining a timing node 621 and comprising a timing capacitor $C_T$, a diode D1 and a current sink 605 providing a constant current $I_T$ may correspond to the timing circuit 51 shown in FIG. 5a.

A circuit 61 comprising a first (MAKE) comparator 603, a second (BRAKE) comparator 604, a first threshold voltage $V_{TH1}$, a second threshold voltage $V_{TH2}$, and the timing circuit 62 may correspond to the thresholding circuit 50 shown in FIG. 5a, with like components bearing like designations. The output of the MAKE comparator 603 is used to set a first set-reset latch 601 (the pulse width modulator or the PWM latch) to turn on the primary switch Q1. The output of the BRAKE comparator 604 is used to reset a second set-reset latch 602 (the synchronizer or the SYNC latch) to turn off the synchronous switch Q2. The SYNC latch 602 is reset dominant, which means if both the set and the reset inputs are high, the output will be a reset. The circuit 61 may be considered the precedent switching part of the preferred synchronous power supply control circuit 60 for controlling the turn off of the synchronous switch Q2 before the turn on of the primary switch Q1. The operation of the circuit 61 is substantially similar to that of the circuit 50 shown in FIG. 5a and as described in connection therewith.

A circuit 63 comprising a third comparator 606 (the synchronizing comparator or the SYNC comparator), an AND gate 607, and an inverter 608 may correspond to the circuit 40 shown in FIG. 4a, with like components bearing like designations. The output of the AND gate 607 is used to set the SYNC latch 602 to turn on the synchronous switch Q2. The circuit 63 may be considered the semi-soft switching part of the preferred synchronous power supply control circuit 60 for controlling the turn on of the synchronous switch Q2 after the turn off of the primary switch Q1. The operation of the circuit 63 is substantially similar to that of the circuit shown in FIG. 4a and as described in connection thereof.

The power supply control circuit 60 further comprises a circuit 64 for turning off the primary switch Q1 in response to sensing an output current or an output voltage of the power supply exceeding predetermined limits. The voltage across a current sensing resistor $R_S$, which is coupled in series with an output inductor L between the switching node 622 and an output node 624, is sensed by a fourth, current sensing amplifier 609 (the CSA comparator) having an internally generated reference voltage. The output voltage at the output node 624 is sensed through a voltage divider 612, and compared to a second reference voltage $V_{ref2}$ by a fifth comparator 611 (the error amplifier or the EA comparator). The reference voltage $V_{ref2}$ may be supplied by a temperature compensated voltage generator (not shown). The outputs of the CSA comparator 609 and the EA comparator 611 are ORed to reset the PWM latch 601 to turn off the primary switch Q1.

Figure 6B:
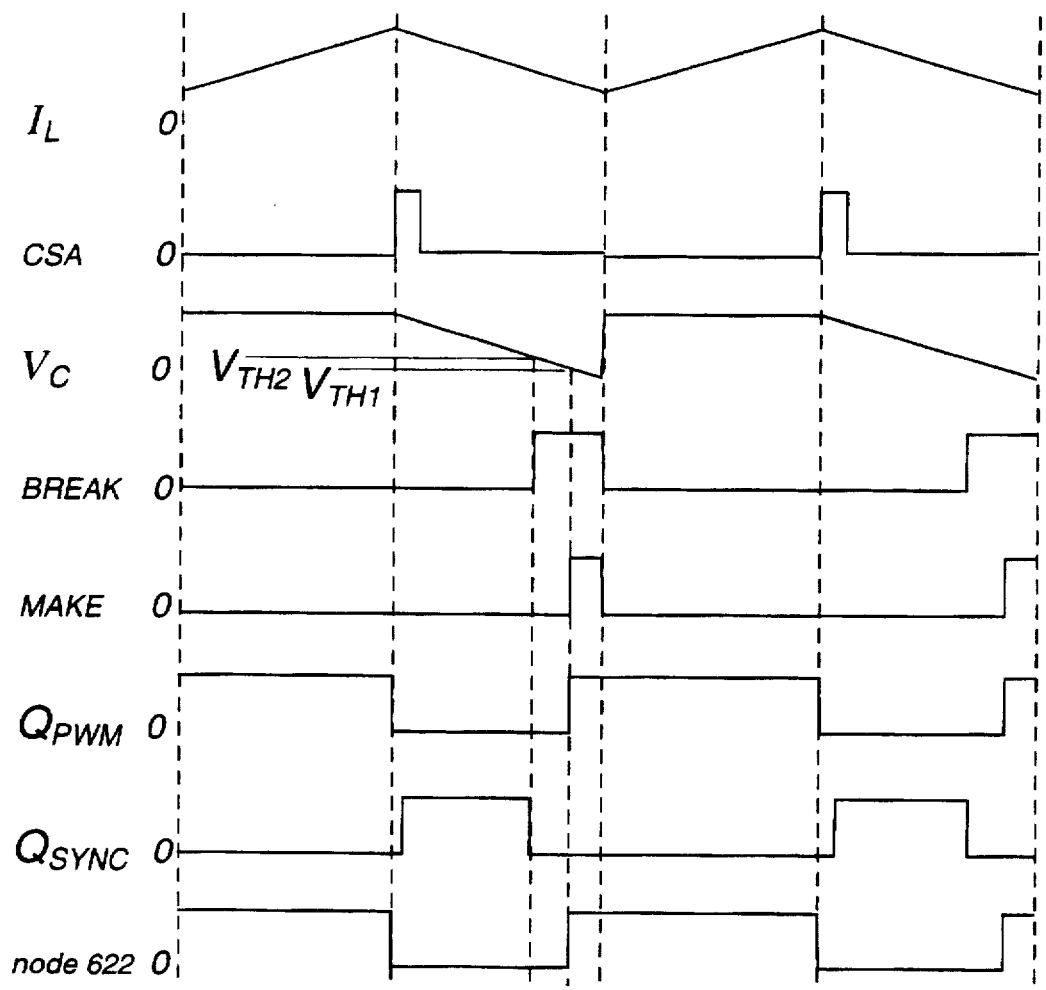

The operation of the control circuit 60 is now described. The corresponding timing diagrams shown in FIG. 6b will be self-explanatory to those skilled in the art. During an on period, the output inductor current $I_L$ and the output voltage at the output node 624 increase with time. When the output current $I_L$ exceeds a limit determined by the current sensing resistor $R_S$ and the internal reference voltage of the CSA comparator 609, or when the output voltage at the output node 624 exceeds a limit determined by the voltage divider 612 and the reference voltage $V_{ref2}$, the PWM latch 601 is reset to turn off the primary switch Q1.

As the primary switch is turned off and the voltage at the switching node 622 drops below the first reference voltage $V_{ref1}$, the SYNC comparator 606 through the AND gate 607 sets the SYNC latch 602, which turns on the synchronous switch Q2 to provide a low resistance path for the inductor current. ANDing the output of the SYNC comparator 606 with the inverse of the control signal driving the primary switch ensures that the turn on of the synchronous switch Q2 in response to a false output signal, such as an output short, will not occur. This prevents shoot through current when there is an output short.

During the on period of the primary switch when the voltage level at the control terminal of the primary switch Q1 is high, the timing capacitor $C_T$ is charged through diode D1. When the power supply is in the off period of the primary switch Q1, the capacitor $C_T$ discharges through the current sink 605, thereby generating a descending linear timing voltage $V_C$ at the timing node 621. When the timing voltage $V_C$ drops below the second threshold voltage $V_{TH2}$, the BRAKE comparator 604 resets the reset-dominant SYNC latch 602 and turns off the synchronous switch Q2. When the timing voltage at node 621 subsequently drops below the first threshold voltage $V_{TH1}$, the MAKE comparator 603 sets the PWM latch 601 and turns on the primary switch Q2. This causes the power supply to go back to the on period of the primary switch Q1. This process is repeated and the primary switch Q1 is periodically turned on and off.

The various threshold or reference voltages generated for comparators 603, 604, 606 and 611, the current $I_T$ from the current source 605, along with the size of the timing capacitor $C_T$ affect system performance. The reference voltage $V_{ref2}$ sets the output voltage, while the threshold voltages $V_{TH1}$ and $V_{TH2}$, the capacitance of capacitor $C_T$ and the current $I_T$ set the constant off time. The reference voltage $V_{ref1}$ sets the voltage level to which the switching node must fall before the synchronous switch Q2 can turn on. The voltage level $V_{ref1}$ should be set below the difference between the supply voltage $V_{CC}$ and the saturation voltage of the primary transistor Q1, and preferably high enough to permit the synchronous switch Q2 to turn on almost immediately after the primary switch Q1 turns off. The threshold voltages $V_{TH1}$ and $V_{TH2}$ should be selected based upon the switching speed of the latches 601 and 602 and comparators 603 and 604 to ensure that switch Q2 will turn off before switch Q1 turns on.

Figure 7:
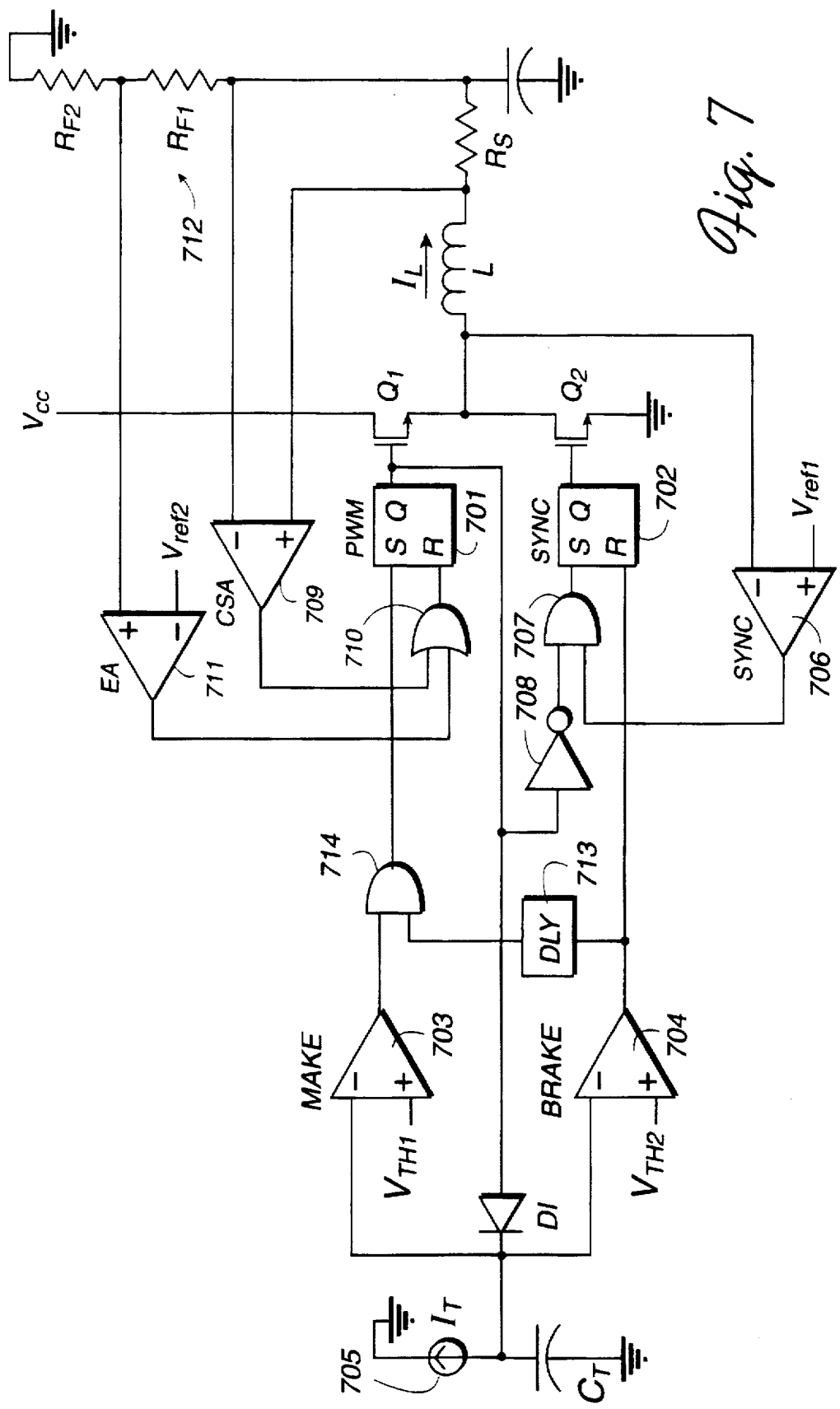
FIG. 7 is a simplified circuit diagram of a control circuit for semi-soft switching and precedent switching incorporating another preferred embodiment of the present invention.

FIG. 7 is a simplified block diagram of a circuit incorporating another preferred embodiment of the present invention. This circuit is similar to that shown in FIG. 6a, with like components bearing like numbers, with the exception of an added delay circuit 713 and an AND gate 714. The output of the MAKE comparator 703 is ANDed with the delayed output of the BRAKE comparator 704 to set the PWM latch 701 to turn on the primary switch Q1. This ensures that the turning on of the primary switch Q1 is delayed by at least a predetermined time period after the synchronous switch Q2 is turned off. Such an additional delay mechanism may be desired for very high frequency precedent switching to prevent shoot through current during the turn on of the primary switch, when the timing precedence determined by the timing circuit and the threshold voltages $V_{TH2}$ and $V_{TH1}$ may be insufficient for the synchronous switch Q2 to turn off before the primary switch Q1 is turned on.

Although specific embodiments of the invention are disclosed, it would be understood by those of ordinary skill in the art that other embodiments may be used and are within the scope of the invention. For example, although a linear voltage ramp generated by a timing capacitor and a current generator is used to achieve precedent switching, voltage ramps of other shapes or generated by other means may be used. Further, each reference voltage and threshold reference may be set at appropriate values, or be adjustable to obtain optimized results for particular applications. The scope of the invention should be determined by the claims.

What is claimed is:

1. A DC to DC power supply control circuit comprising:
    a first and a second switch each having a control terminal, each switch further having a conductive state allowing current to flow through the switch in response to a control signal in a first state being coupled at the control terminal, and a nonconductive state allowing substantially no current to flow through the switch in response to a control signal in a second state being coupled at the control terminal, the switches being coupled to define a switching node such that the current flowing through each switch flows through the switching node;
    a comparator circuit for comparing the voltage level at the switching node with a predetermined reference voltage level, the comparator circuit being operable to generate a control signal of the first state in response to the voltage level at the switching node being lower than the predetermined reference voltage level; and
    logic coupled to the comparator circuit and responsive to the control signal at the control terminal of the first switch for coupling the control signal generated by the comparator circuit to the control terminal of the second switch only when the control signal at the control terminal of the first switch is in the second state.

2. A DC to DC power supply control circuit comprising:
    a first and a second switch each having a control terminal, each switch further having a conductive state allowing current to flow through the switch in response to a control signal in a first state being coupled at the control terminal, and a nonconductive state allowing substantially no current to flow through the switch in response to a control signal in a second state being coupled at the control terminal, the switches being coupled to define a switching node such that the current flowing through each switch flows through the switching node;
    a timing circuit for generating a timing signal in response to the control signal at the control terminal of the first switch being in the second state; and
    a comparator circuit responsive to the timing signal for producing a control signal in the second state at the control terminal of the second switch prior to producing a control signal in the first state at the control terminal of the first switch.

3. The power supply control circuit of claim 2 wherein the timing circuit comprises a timing capacitor.

4. The power supply control circuit of claim 2 wherein the timing signal is a timing voltage level and wherein the comparator circuit is coupled to a first and a second threshold voltage level.

5. The power supply control circuit of claim 4 wherein the timing voltage level changes monotonously with time in response to the control signal at the control terminal of the first switch being in the second state, and wherein the timing voltage reaches a level equal to the second threshold voltage level before it reaches a level equal to the first threshold voltage level.

6. The power supply control circuit of claim 5 wherein the comparator circuit comprises a first comparator for generating a control signal in the first state at the control terminal of the first switch in response to the timing voltage reaching a level equal to the first threshold voltage level, and a second comparator for generating a control signal in the second state at the control terminal of the second switch in response to the timing voltage reaching a level equal to the second threshold voltage level.

7. A DC to DC power supply control circuit comprising:
    a first and a second switch each having a control terminal, each switch further having a conductive state allowing current to flow through the switch in response to a control signal in a first state being coupled at the control terminal, and a nonconductive state allowing substantially no current to flow through the switch in response to a control signal in a second state being coupled at the control terminal, the switches being coupled to define a switching node such that the current flowing through each switch flows through the switching node;
    a first comparator circuit for comparing the voltage level at the switching node with a predetermined reference voltage level, the comparator circuit operable to generate a control signal of the first state in response to the voltage level at the switching node being lower than the predetermined reference voltage level;
    logic coupled to the first comparator circuit and responsive to the control signal at the control terminal of the first switch for coupling the control signal generated by the first comparator circuit to the control terminal of the second switch only when the control signal at the control terminal of the first switch is in the second state;
    a timing circuit for generating a timing signal in response to the control signal at the control terminal of the first switch being in the second state; and
    a second comparator circuit responsive to the timing signal for generating a control signal in the second state at the control terminal of the second switch prior to generating a control signal in the first state at the control terminal of the first switch.

8. The power supply control circuit of claim 7 wherein the control circuit provides an output voltage and an output current, the control circuit further comprising a sensing circuit for sensing the output voltage and the output current, the sensing circuit being operable to generate a control signal in the second state at the control terminal of the first switch in response to sensing an output current level exceeding a predetermined current limit or an output voltage level exceeding a predetermined voltage limit.

9. The power supply control circuit of claim 7 wherein the timing circuit comprises a timing capacitor.

10. The power supply control circuit of claim 7 wherein the timing signal is a timing voltage level and wherein the comparator circuit is coupled to a first and a second threshold voltage level.

11. The power supply control circuit of claim 10 wherein the timing voltage level changes monotonously with time in response to the control signal at the control terminal of the first switch being in the second state, and wherein the timing voltage reaches a level equal to the second threshold voltage level before it reaches a level equal to the first threshold voltage level.

12. The power supply control circuit of claim 11 wherein the comparator circuit comprises a first comparator for generating a control signal in the first state at the control terminal of the first switch in response to the timing voltage reaching a level equal to the first threshold voltage level, and a second comparator for generating a control signal in the second state at the control terminal of the second switch in response to the timing voltage reaching a level equal to the second threshold voltage level.

13. A method for controlling a DC to DC power supply comprising:

coupling a first and a second switch such that the current flowing through each switch flows through a switching node, each switch having a control terminal, each switch further having a conductive state allowing current to flow through the switch in response to a control signal in a first state being coupled at the control terminal, and a nonconductive state allowing substantially no current to flow through the switch in response to a control signal of a second state being coupled at the control terminal;

sensing the voltage at the switching node;

sensing the control signal at the control terminal of the first switch;

generating a control signal in the first state in response to sensing a voltage level at the switching node below a predetermined reference voltage level; and coupling the generated control signal in the first state to the control terminal of the second switch when the sensed control signal at the control terminal of the first switch is in the second state.

14. A method for controlling a DC to DC power supply comprising:

coupling a first and a second switch such that the current flowing through each switch flows through a switching node, each switch having a control terminal, each switch further having a conductive state allowing current to flow through the switch in response to a control signal in a first state being coupled at the control terminal, and a nonconductive state allowing substantially no current to flow through the switch in response to a control signal of a second state being coupled at the control terminal;

generating a timing voltage in response to a control signal in the second state being at the control terminal of the first switch, the timing voltage changing monotonously with time, the timing voltage reaching a level equal to a second threshold voltage level prior to reaching a level equal to a first threshold voltage level;

coupling a control signal in the second state at the control terminal of the second switch in response to the timing voltage reaching a level equal to the second threshold voltage level; and coupling a control signal in the first state at the control terminal of the first switch in response to the timing voltage reaching a level equal to the first threshold voltage level.

* * * * *